US012656565B2

(12) United States Patent
Ruiz

(10) Patent No.: US 12,656,565 B2
(45) Date of Patent: Jun. 16, 2026

(54) MOUNTING BRACKET ASSEMBLY STRUCTURALLY CONFIGURED TO MOUNT OPTICAL FIBER MANAGEMENT COMPONENTS, INCLUDING DIFFERENT SIZE COMMUNICATION DEVICES, IN AN ENCLOSURE

(71) Applicant: PPC BROADBAND, INC., East Syracuse, NY (US)

(72) Inventor: Gilibaldo Ruiz, Laguna Vista, TX (US)

(73) Assignee: PPC BROADBAND, INC., East Syracuse, NY (US)

( * ) Notice: Subject to any disclaimer, the term of this patent is extended or adjusted under 35 U.S.C. 154(b) by 270 days.

(21) Appl. No.: 18/390,330

(22) Filed: Dec. 20, 2023

(65) Prior Publication Data

US 2024/0201462 A1 Jun. 20, 2024

Related U.S. Application Data

(60) Provisional application No. 63/434,003, filed on Dec. 20, 2022.

(51) Int. Cl.
*G02B 6/44* (2006.01)
*G02B 6/38* (2006.01)
(52) U.S. Cl.
CPC ......... *G02B 6/4452* (2013.01); *G02B 6/3825* (2013.01); *G02B 6/3897* (2013.01);
(Continued)
(58) Field of Classification Search
CPC .. G02B 6/3825; G02B 6/3897; G02B 6/4446; G02B 6/4452; G02B 6/44526; G02B 6/4455; G02B 6/4457
See application file for complete search history.

(56) References Cited

U.S. PATENT DOCUMENTS

| | | | | |
|---|---|---|---|---|
| 9,690,064 | B2 * | 6/2017 | Sauter | G02B 6/4455 |
| 2007/0111575 | A1 * | 5/2007 | Jensen | H01R 13/645 |
| | | | | 439/246 |
| 2007/0189692 | A1 * | 8/2007 | Zimmel | G02B 6/4452 |
| | | | | 385/134 |

FOREIGN PATENT DOCUMENTS

| | | |
|---|---|---|
| CN | 212314199 U | 1/2021 |
| DE | 202012104830 U1 | 3/2014 |

(Continued)

OTHER PUBLICATIONS

International Search Report and Written Opinion dated Apr. 18, 2024 in corresponding International Application No. PCT/US2023/085047, 16 pages.

*Primary Examiner* — Daniel Petkovsek
(74) *Attorney, Agent, or Firm* — MH2 TECHNOLOGY LAW GROUP LLP; Stuart I. Smith

(57) ABSTRACT

A cable management and mounting system including: a base portion; a support portion configured to slidingly attach to the base portion; and a lateral portion configured to slidingly attach to the base portion. The support portion may include an adapter receiving portion. A space between the base portion and the support portion may be configured to receive a communication device. The support portion and the lateral portion may be configured to receive different sized communication devices, different sized adapter units, and cable in an arrangement that may be configured to accommodate the different sized communication devices, the different sized adapter units, and the cable using adapter mounting portions and cable management structures that may be configured to engage with the support portion to avoid a need for additional mounting structures.

29 Claims, 10 Drawing Sheets

(52) U.S. Cl.
CPC ........ _G02B 6/4446_ (2013.01); _G02B 6/44526_
_(2023.05); G02B 6/4455_ (2013.01); _G02B_
_6/4457_ (2013.01)

(56)                      References Cited

FOREIGN PATENT DOCUMENTS

WO       WO-2008017622 A1 *  2/2008   ............. G02B 6/475
WO          2019014295  A1     1/2019

* cited by examiner

MOUNTING BRACKET ASSEMBLY STRUCTURALLY CONFIGURED TO MOUNT OPTICAL FIBER MANAGEMENT COMPONENTS, INCLUDING DIFFERENT SIZE COMMUNICATION DEVICES, IN AN ENCLOSURE

CROSS-REFERENCE TO RELATED APPLICATION

This application claims the benefit of U.S. Provisional Application No. 63/434,003 filed Dec. 20, 2022, the disclosure of which is hereby incorporated by reference herein in its entirety.

BACKGROUND

The present invention relates generally to optical fiber cable management. More particularly, the present invention relates to mounting optical fiber management features and a router in an enclosure.

Conventional systems do not provide compact, adjustable, and reconfigurable mounting of a router, adapters, and associated cable management features in a compact enclosure.

There is a need for a system that provides compact, adjustable, and reconfigurable mounting of a router, adapters, and associated cable management features in a compact enclosure. It may be desirable to provide such a system that includes a base, a support, and a lateral plate that are configured to receive different sized routers, different sized adapter units, and cable in an arrangement that is adjustable to accommodate the different sized routers, the different sized adapter units, and the cable using adapter mounting tabs and cable management features that are monolithic with the support to avoid a need for additional mounting features.

SUMMARY

The present disclosure provides a much needed compact, adjustable, and reconfigurable mounting system for a router, adapters, and associated cable management features in a compact enclosure. Embodiments provide a base, a support, and a lateral plate that are configured to receive different sized routers, different sized adapter units, and cable in an arrangement that is adjustable to accommodate the different sized routers, the different sized adapter units, and the cable using adapter mounting tabs and cable management features that are monolithic with the support to avoid a need for additional mounting features.

Embodiments provide a cable management and mounting system having an attachment portion and a lateral portion that are structurally configured to provide an adjustable arrangement of a base portion, the support portion, and the lateral portion such that the base portion, the support portion, and the lateral portion are structurally configured to receive different sized routers, different sized adapter units, and cable in an arrangement that is adjustable to accommodate the different sized routers, the different sized adapter units, and the cable using adapter mounting portions and cable management features that are monolithic with the support portion to avoid a need for additional mounting features.

Embodiments provide a cable management and mounting system including: a base portion that includes a mounting portion structurally configured to be connected to an enclosure; a support portion structurally configured to be connected to the base portion; and a lateral portion structurally configured to be connected to the base portion. The support portion may include a support plate. The base portion may include a connector portion structurally configured to connect to the support plate. The support portion may include an attachment portion structurally configured to attach to the connector portion. The support portion may include an adapter receiving portion that may extend from the support plate. The adapter receiving portion may be monolithically formed with the support plate. The attachment portion may be structurally configured to slidingly attach to the connector portion to provide adjustment to a distance between the base portion and the support plate in a first direction perpendicular to a surface of the base portion. The lateral portion may be structurally configured to slidingly attach to the base portion to provide adjustment to a distance between the lateral portion and the connector portion. A space between the base portion and the support plate may be structurally configured to receive a router. The space may be structurally configured to be between the lateral portion and the connector portion. The lateral portion may be structurally configured to contact the router. The attachment portion and the lateral portion may be structurally configured to selectively receive different sized communication devices, different sized adapter units, and cable in an arrangement that may be configured to accommodate the different sized communication devices, the different sized adapter units, and the cable using adapter mounting portions and cable management features that may be configured to selectively engage with the support portion so as to avoid a need for additional mounting structures.

In particular embodiments, the lateral portion may comprise a lateral plate.

In particular embodiments, the base portion may comprise a base plate.

In particular embodiments, the mounting portion may comprise a plurality of mounting plates.

In particular embodiments, the connector portion may comprise a plurality of connector plates.

In particular embodiments, the attachment portion may comprise a plurality of attachment plates.

In particular embodiments, the adapter receiving portion may be structurally configured to receive an adapter unit that holds an adapter.

In particular embodiments, the distance between the lateral portion and the connector portion may be in a second direction parallel to the surface of the base portion.

In particular embodiments, a cable management spool may be attached to the support plate and the communication device may comprise a router.

In particular embodiments, the adapter receiving portion may be monolithically formed with the support portion.

Embodiments provide a cable management and mounting system including: a base portion; a support portion structurally configured to slidingly attach to the base portion to provide adjustment to a distance between the base portion and the support portion; and a lateral portion structurally configured to slidingly attach to the base portion to provide adjustment to a distance between the lateral portion and a connector portion of the base portion. The support portion may include an adapter receiving portion monolithically formed with a plate portion of the support portion. A space between the base portion and the support portion may be structurally configured to receive a router. The space may be structurally configured to be between the lateral portion and the connector portion. The support portion and the lateral portion may be structurally configured to provide an adjustable arrangement of the base portion, the support portion, and the lateral portion such that the base portion, the support portion, and the lateral portion may be structurally configured to receive different sized routing devices, different sized adapter units, and cable in an arrangement that may be configured to accommodate the different sized routing devices, the different sized adapter units, and the cable using adapter mounting portions and cable management features that may be configured to engage with the support portion so as to avoid a need for additional mounting features.

In particular embodiments, the support portion may include a support plate.

In particular embodiments, the base portion may include a mounting portion that may be structurally configured to be connected to an enclosure.

In particular embodiments, the support portion may include an attachment portion that may be structurally configured to attach to the connector portion.

In particular embodiments, the distance between the base portion and the support portion may be in a first direction perpendicular to a surface of the base portion.

In particular embodiments, the distance between the lateral portion and the connector portion may be in a second direction parallel to the surface of the base portion.

In particular embodiments, the lateral portion may be structurally configured to contact the routing device.

In particular embodiments, the lateral portion may comprise a lateral plate.

In particular embodiments, the base portion may comprise a base plate.

In particular embodiments, a cable management spool may be attached to the support portion and the routing device may comprise a router.

In particular embodiments, the adapter receiving portion may be monolithically formed with the support portion.

Embodiments provide a cable management and mounting system including: a base portion; a support portion structurally configured to slidingly attach to the base portion; and a lateral portion structurally configured to slidingly attach to the base portion. The support portion may include an adapter receiving portion. A space between the base portion and the support portion may be structurally configured to receive a communication device. The space may be structurally configured to be between the lateral portion and a connector portion of the base portion. The support portion and the lateral portion may be structurally configured to receive different sized communication devices, different sized adapter units, and cable in an arrangement that may be configured to accommodate the different sized communication devices, the different sized adapter units, and the cable using adapter mounting portions and cable management structures that may be configured to engage with the support portion to avoid a need for additional mounting structures.

In particular embodiments, the support portion may be structurally configured to slidingly attach to the base portion to provide adjustment to a distance between the base portion and the support portion.

In particular embodiments, the lateral portion may be structurally configured to slidingly attach to the base portion to provide adjustment to a distance between the lateral portion and a connector portion of the base portion.

In particular embodiments, the distance between the base portion and the support portion may be in a first direction perpendicular to a surface of the base portion.

In particular embodiments, the distance between the lateral portion and the connector portion may be in a second direction parallel to the surface of the base portion.

In particular embodiments, the support portion may include a support plate.

In particular embodiments, the adapter receiving portion may be monolithically formed with the support portion.

In particular embodiments, the support portion and the lateral portion may be structurally configured to allow the base portion, the support portion and the lateral portion to be adjusted relative to one or more of the other relative to each other so as to accommodate the different sized communication device, the different sized adapter units, and the cable using the adapter mounting portions and the cable management structures.

Various aspects of the system, as well as other embodiments, objects, features and advantages of this disclosure, will be apparent from the following detailed description of illustrative embodiments thereof, which is to be read in conjunction with the accompanying drawings.

DETAILED DESCRIPTION OF EMBODIMENTS

Embodiments of the disclosure provide a base, a support, and a lateral plate that are configured to receive different sized routers, different sized adapter units, and cable in an arrangement that is configured to accommodate the different sized routers, the different sized adapter units, and the cable to provide a compact mounting system.

Figure 1:
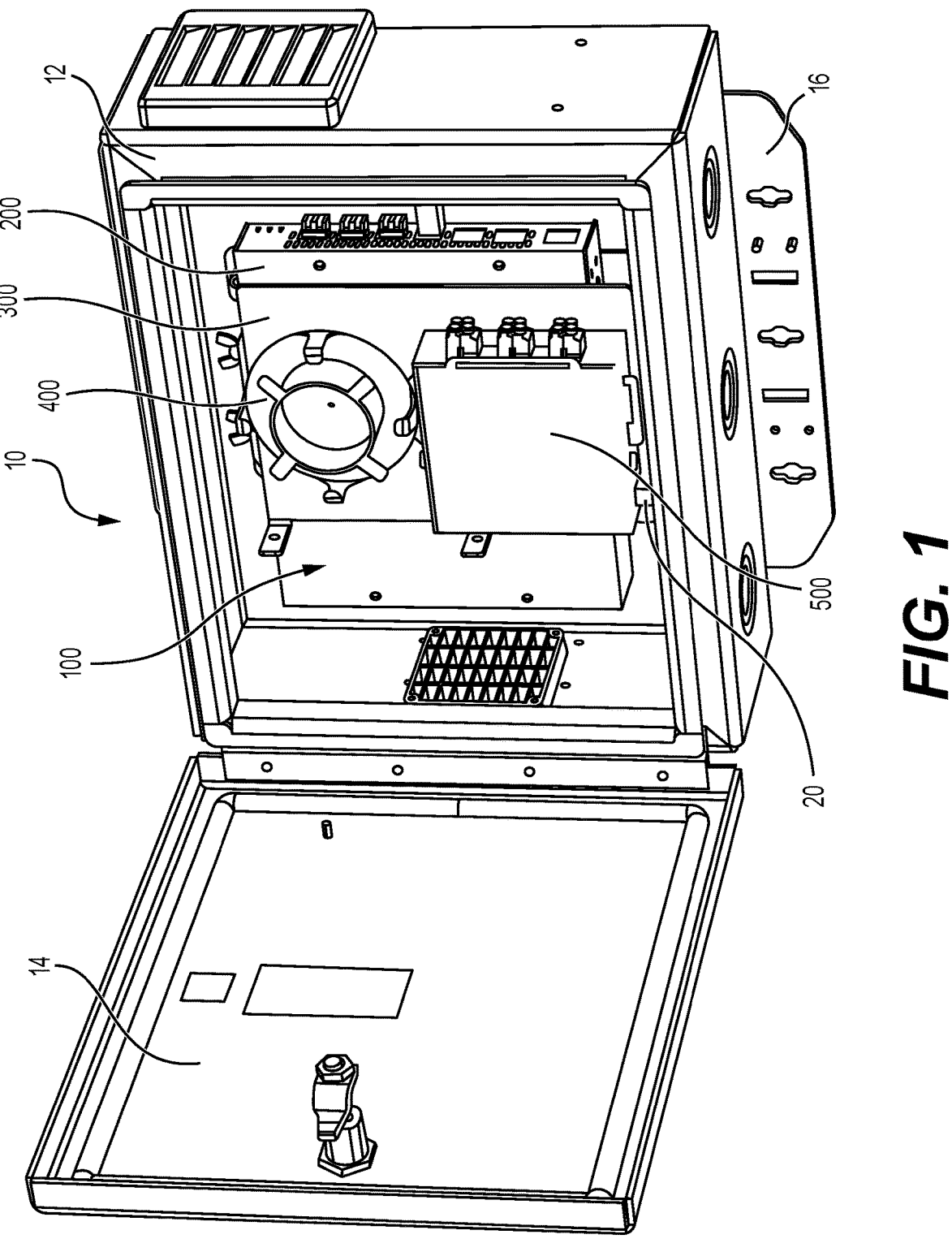
FIG. 1 is a front perspective view of an enclosure including an exemplary mounting assembly in accordance with various aspects of the disclosure.

FIGS. 1-5 show exemplary assemblies 100 in accordance with embodiments of the disclosure mounted in a compact enclosure 10. In this example, enclosure 10 has a housing 12 and a door 14 that provides access to the housing 12. An incoming cable 20 enters the enclosure 10 through a hole in the enclosure 10. One or more brackets 16 are provided for attaching the enclosure 10 to a wall or backing plate. Several exemplary embodiments of the assembly 100 are shown. In FIG. 1, the assembly 100 includes a router 200 in a mounting assembly 300, a slack management spool 400 attached to the mounting assembly 300, and a splice and patch box 500 attached to the mounting assembly 300. In this example, the incoming cable 20 is a fiber optic cable, enters the splice and patch box 500, and is split into a plurality of optical fibers. The splice and patch box 500 is just one example of a box or other feature (such as, for example, an LGX patch panel with thermal features) that can be mounted to the mounting assembly 300.

Figure 2:
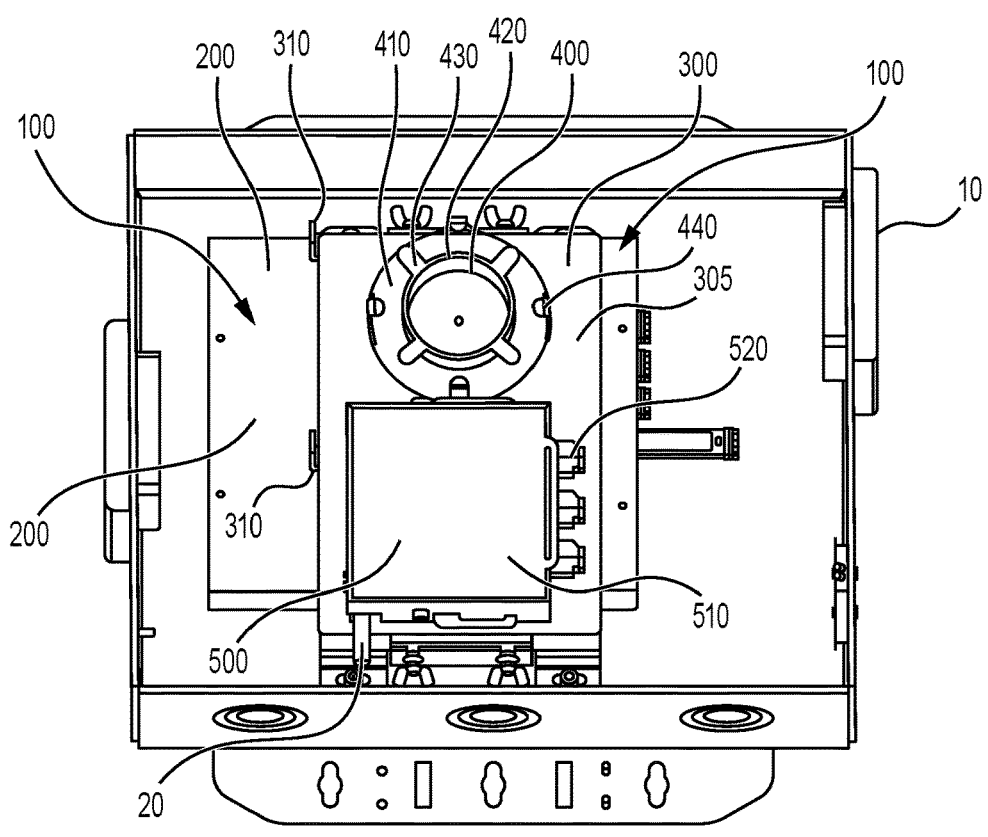
FIG. 2 is a front view the enclosure of FIG. 1 and the mounting assembly of FIG. 1.

FIG. 2 is a front view of the example shown in FIG. 1. FIG. 2 shows the mounting assembly 300 having a support portion, for example a support plate, 305 that, in this example, is a planar plate that is configured to be parallel to a back panel of the enclosure 10. FIG. 2 shows the slack management spool 400 having various features to facilitate wrapping and maintaining a fiber optic, or other, cable around the slack management spool 400. In this example, the slack management spool 400 has a side wall 420 that extends upward from a base plate 410 that is parallel to the support plate 305. A plurality of inner tabs 430 extend from a top edge of the side wall 420. A plurality of outer tabs 440 extend upward from the base plate 410. A cable wrapped around the side wall 420 is kept in position around the side wall 420 by the inner tabs 430 and the outer tabs 440. FIG. 2 shows the splice and patch box 500 having a housing 510 and one or more (in this case, three) adapters and/or ports 520 for optic fibers exiting the splice and patch box 500. In embodiments, the optical fibers exiting the splice and patch box 500 are optically and mechanically connected to the router 200.

Figure 3:
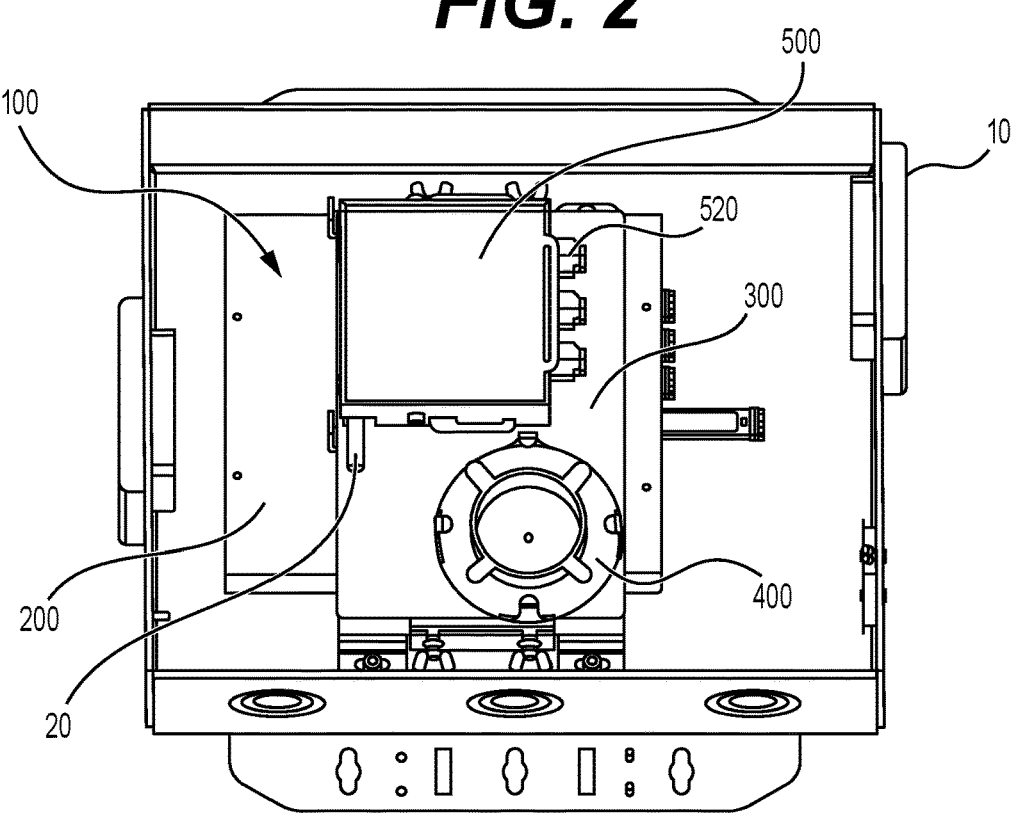
FIG. 3 is a front view of the enclosure of FIG. 1 and a second exemplary mounting assembly in accordance with various aspects of the disclosure.

FIG. 3 shows the same elements as are shown in FIG. 2, but in a different configuration. Various configurations (such as those shown in FIGS. 2 and 3) can be used to adapt to different needs of a particular installation. For example, one of the configurations shown in FIGS. 2 and 3 can be chosen over the other based on the entry point of the incoming cable 20 in to the enclosure 10. For example, the configuration shown in FIG. 3 can be better suited to an installation where the rigidity (or allowable bend radius) of the incoming cable 20 requires a larger distance from the splice and patch box 500 and the opening in the enclosure 10 through which the incoming cable 20 enters the enclosure 10.

Figure 4:
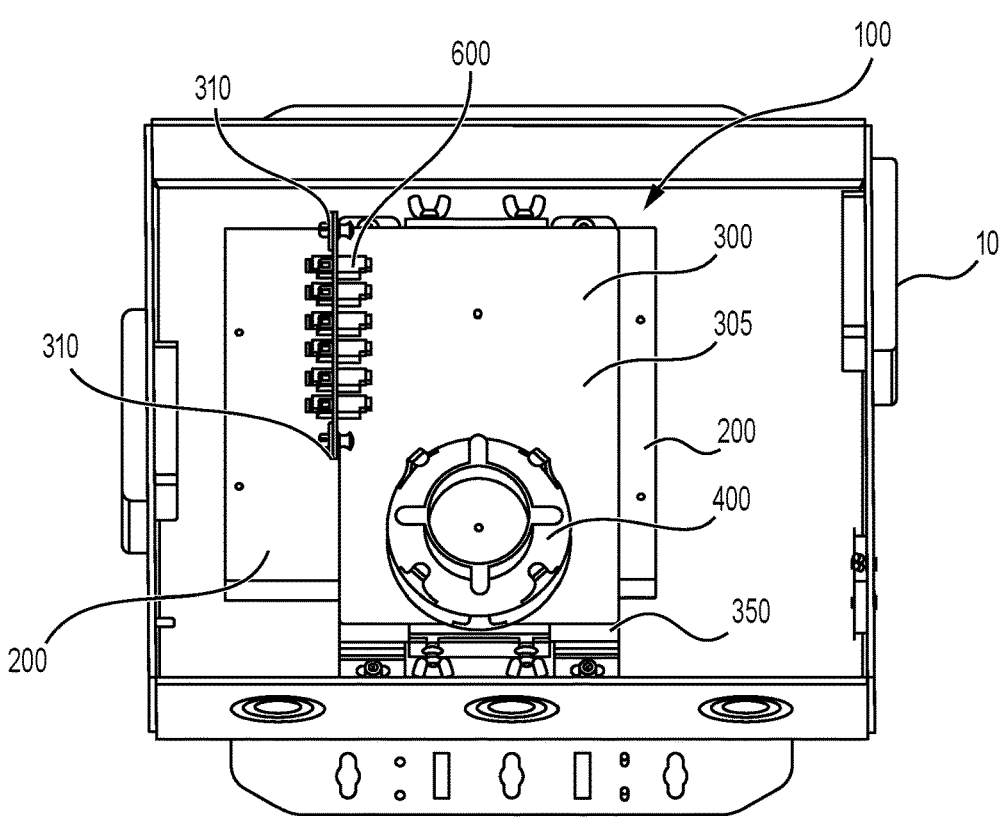
FIG. 4 is a front view of the enclosure of FIG. 1 and a third exemplary mounting assembly in accordance with various aspects of the disclosure.
Figure 5:
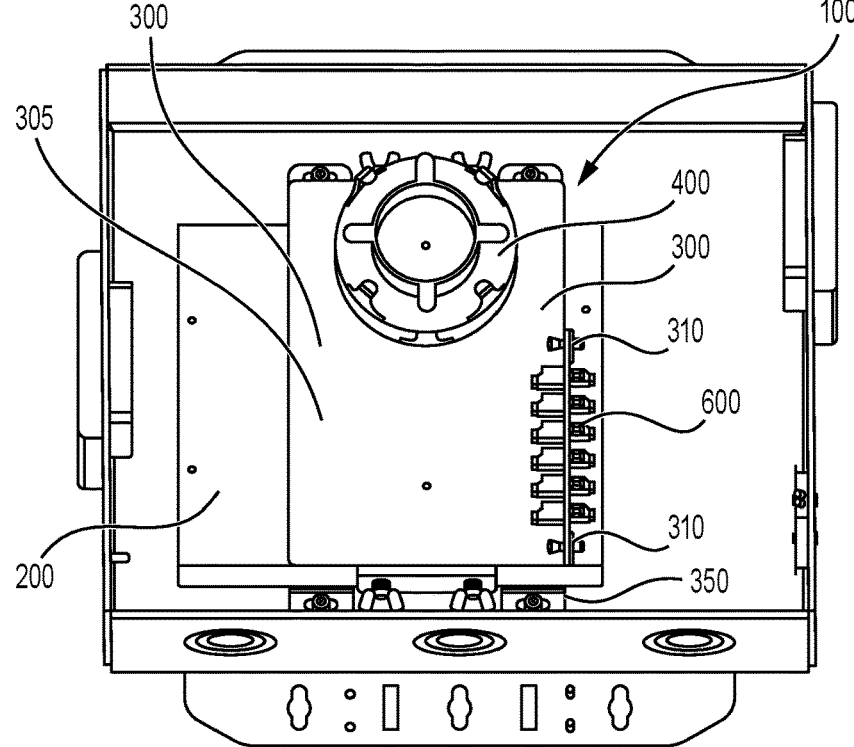
FIG. 5 is a front view of the enclosure of FIG. 1 and a fourth exemplary mounting assembly in accordance with various aspects of the disclosure.

FIG. 4 shows an exemplary embodiment in which one or more, in this example a pair of, adapter receiving portions, for example tabs, 310 extend from the support plate 305 and are monolithic (unitary single-piece construction) with the support plate 305. In this example, the tabs 310 extend perpendicular to the support plate 305. In other examples, the tabs extend at an angle other than 90 degrees from the support plate 305 to better adapt to the device that is attached to the tabs 310. In this example, an adapter panel 600 is mounted to the tabs 310. FIG. 5 shows an installation where the support plate 305 shown in FIG. 4 is mounted 180 degrees from the installation shown in FIG. 4. As is discussed below, in embodiments, the support plate 305 can be mounted to a base portion, for example a base, 350 in either of the positions shown in FIGS. 4 and 5. In embodiments, a number of fins (not shown) extend from the support plate 305 and are configured to receive one or more boxes or other devices between two adjacent ones of the fins.

Figure 6:
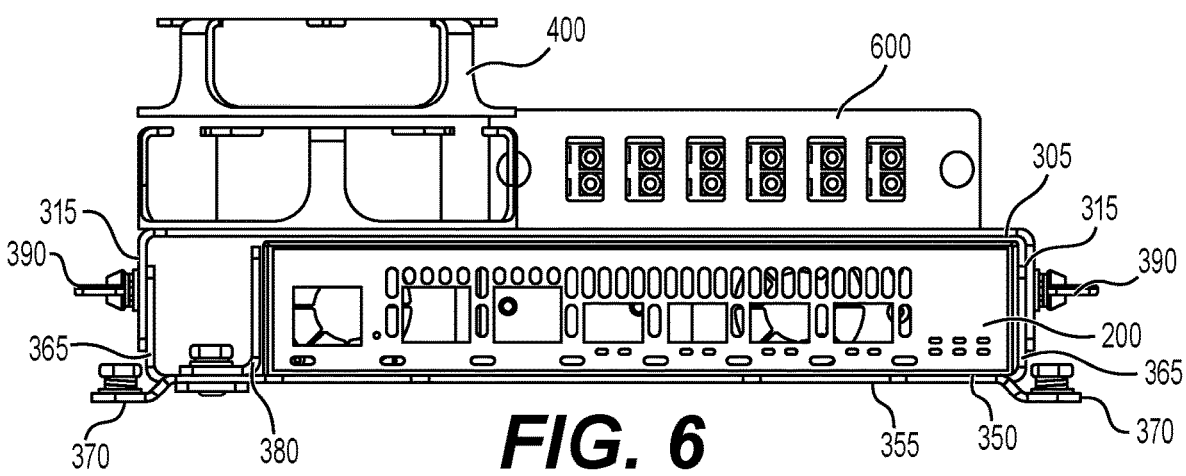
FIG. 6 is a side view of the mounting assembly shown in FIG. 4.
Figure 7:
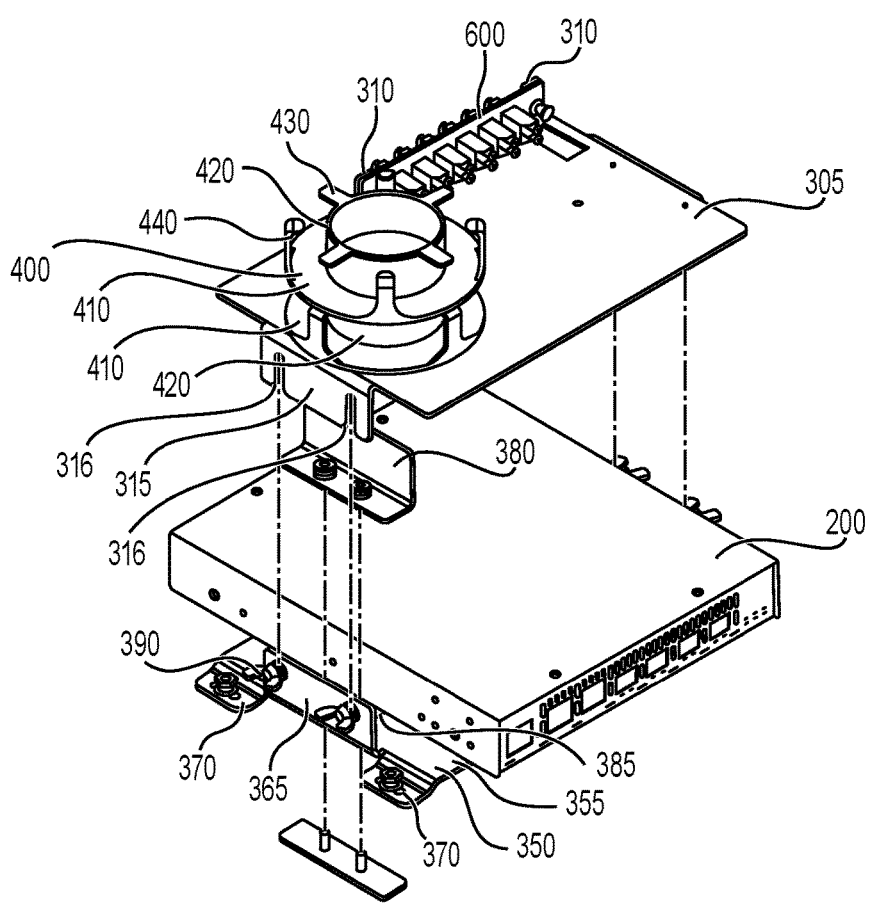
FIG. 7 is an exploded bottom right perspective view of the mounting assembly shown in FIG. 4.
Figure 8:
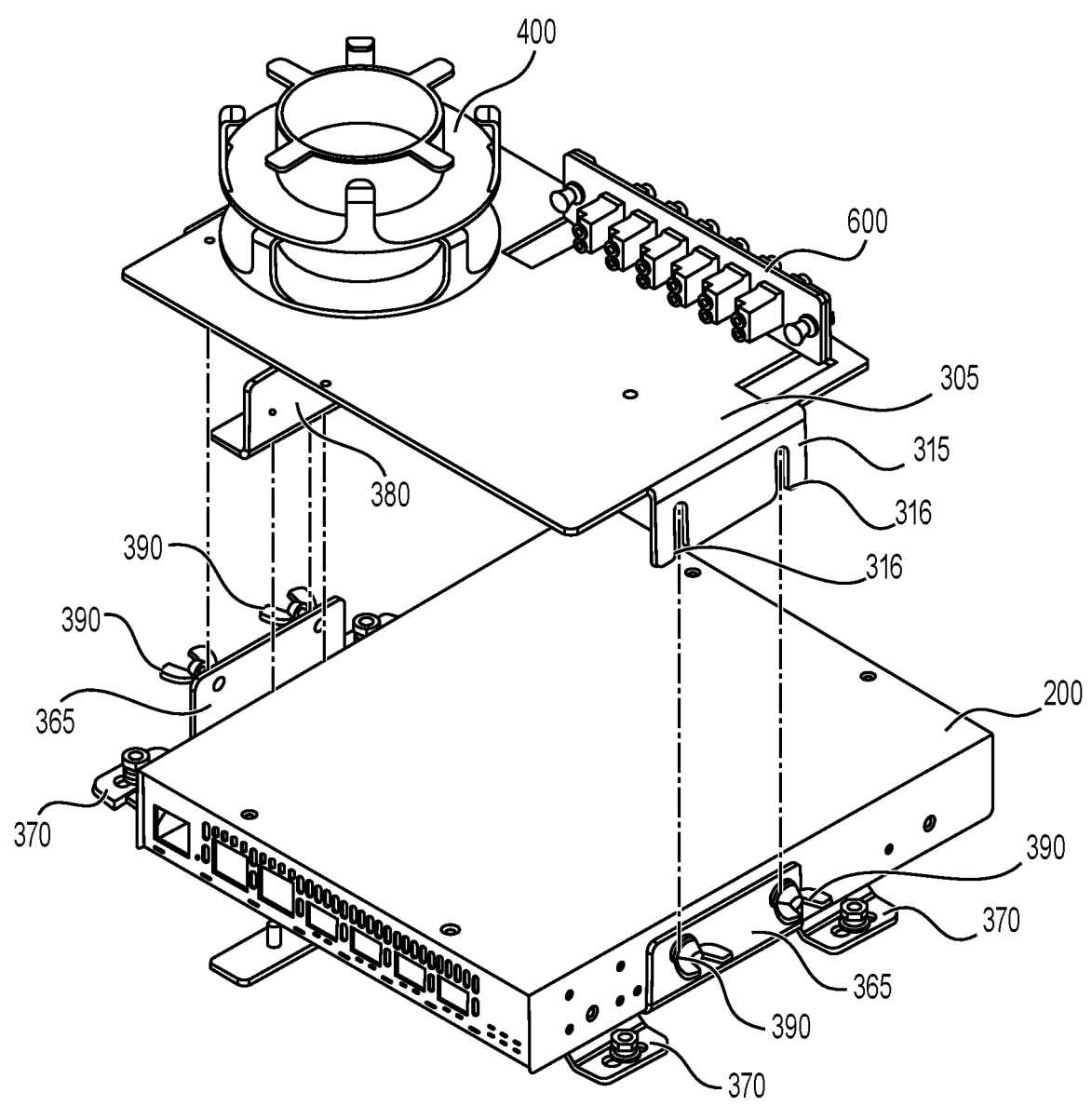
FIG. 8 is an exploded top right perspective view of the mounting assembly shown in FIG. 4.

FIG. 6 is a side view of the configuration of the assembly 100 shown in FIG. 4 and FIGS. 7 and 8 are exploded perspective views of the configuration of the assembly 100 shown in FIG. 4. As shown in FIGS. 6 and 7, the support plate 305 has two attachment plates 315 extending from the support plate 305 at, in this example, 90 degrees. Also, the base 350 has two connector plates 365 extending from the base 350 at, in this example, 90 degrees. The attachment plates 315 are attached to the connector plates 365 by, in this example, four, wing nuts 390. In this example, the support plate 305 can be attached to the base 350 at one of a number of positions due to slots 316 in the attachment plates 315. As shown in FIG. 6, the height of the space between the support plate 305 and a base plate 355 of the base 350 can be set to be slightly more than the thickness of the router 200. In other examples, the support plate contacts the router 200 to securely hold the router 200 in place. Also shown in FIGS. 6 and 7 is a lateral portion, for example a lateral plate, 380 that is attached to the base plate 355 and extends at an angle (in this example, 90 degrees) from the base plate 355. The lateral plate 380 is configured to slide (due to slots 385 in the base plate 355, better shown in FIG. 9) relative to the base plate 355 to accommodate routers of different sizes. In the example shown in FIG. 6, the lateral plate 380 contacts the side of the router 200 to pinch the router 200 between the lateral plate 380 and the connector plate 365 on the opposite side of the router 200. In this example, the assembly 10 is configured to be attached to the enclosure at only base 350. This example includes four mounting plates 370 that extend from the base plate 355. Other examples include fewer or more of the mounting plates 370.

Figure 9:
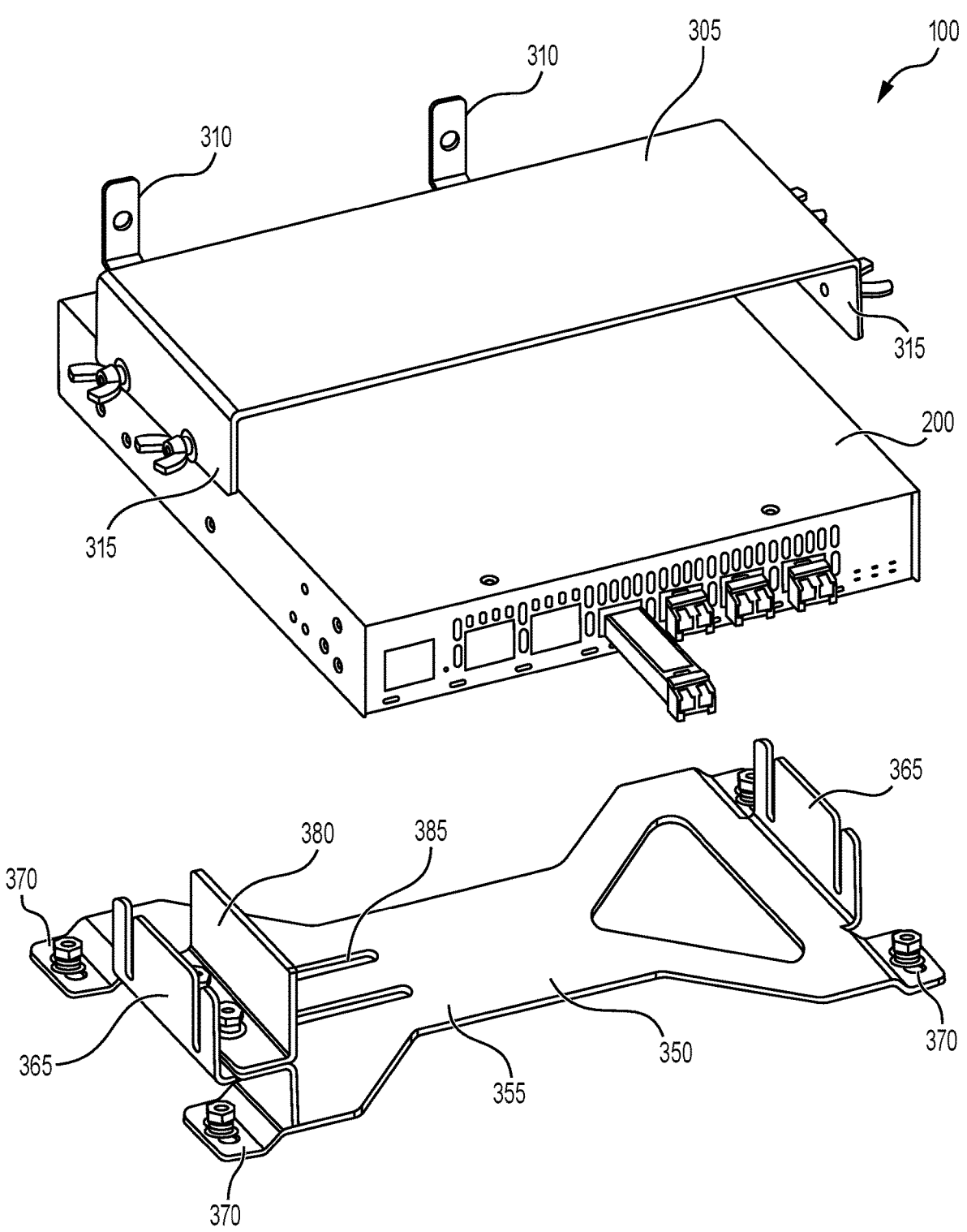
FIG. 9 is an exploded perspective view of an alternate embodiment of the disclosure.

FIG. 9 shows another example of the assembly 100. In this example, the attachment plates 315 fit inside the connector plates 365. The slots 385 in the base 350 can be seen clearly in FIG. 9.

FIGS. 10-13 show some alternate examples of support plate 305. In FIGS. 10-13, the left side attachment plate 315 is shown inside the left side connector plate 365, and the right side attachment plate 315 is shown outside the right side connector plate 365. These figures illustrate how the orientation of the attachment plates 315 and the connector plates 365 can vary in different embodiments. However, it is noted that having the attachment plate 315 on the side opposite the lateral plate 380 positioned outside of the corresponding connector plate 365 has the benefit of the connector plate 365 contacting the router 200, which allows the router 200 to be pinched between the connector plate 365 and the lateral plate 380 (and the lateral plate 380 secured in place) before the mounting assembly 300 is attached to the base 350.

Figure 10:
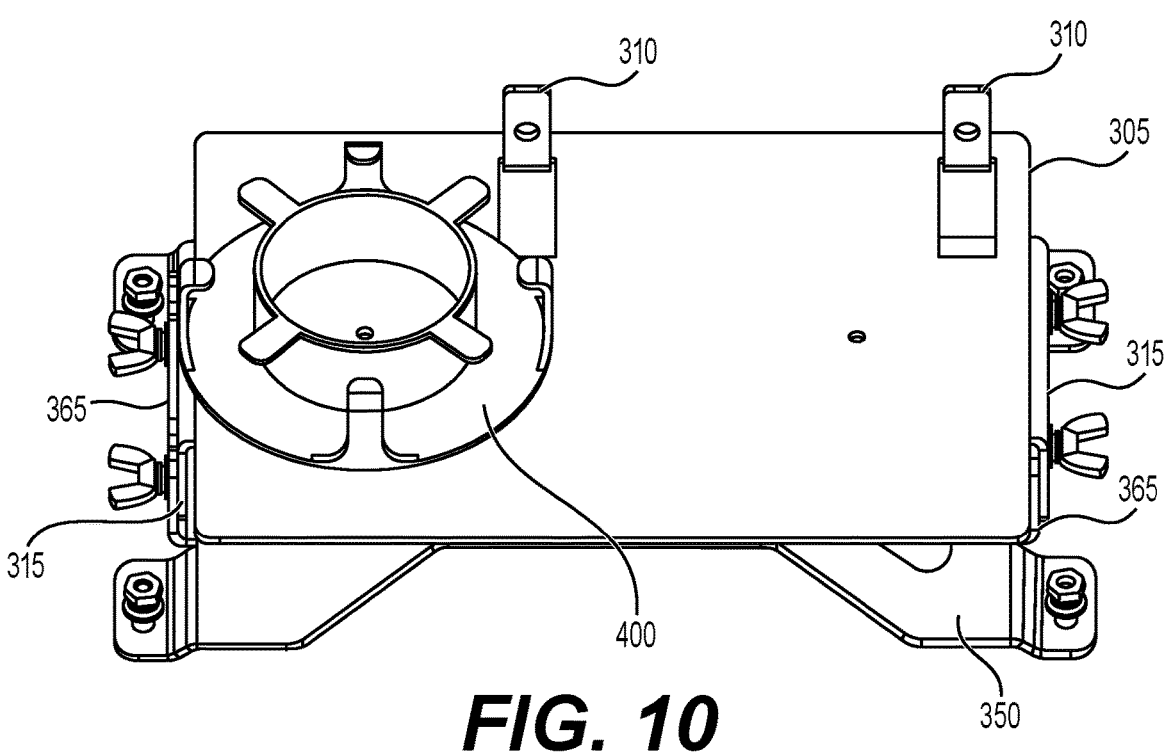
FIG. 10 is a perspective view of an exemplary embodiment of the disclosure.
Figure 11:
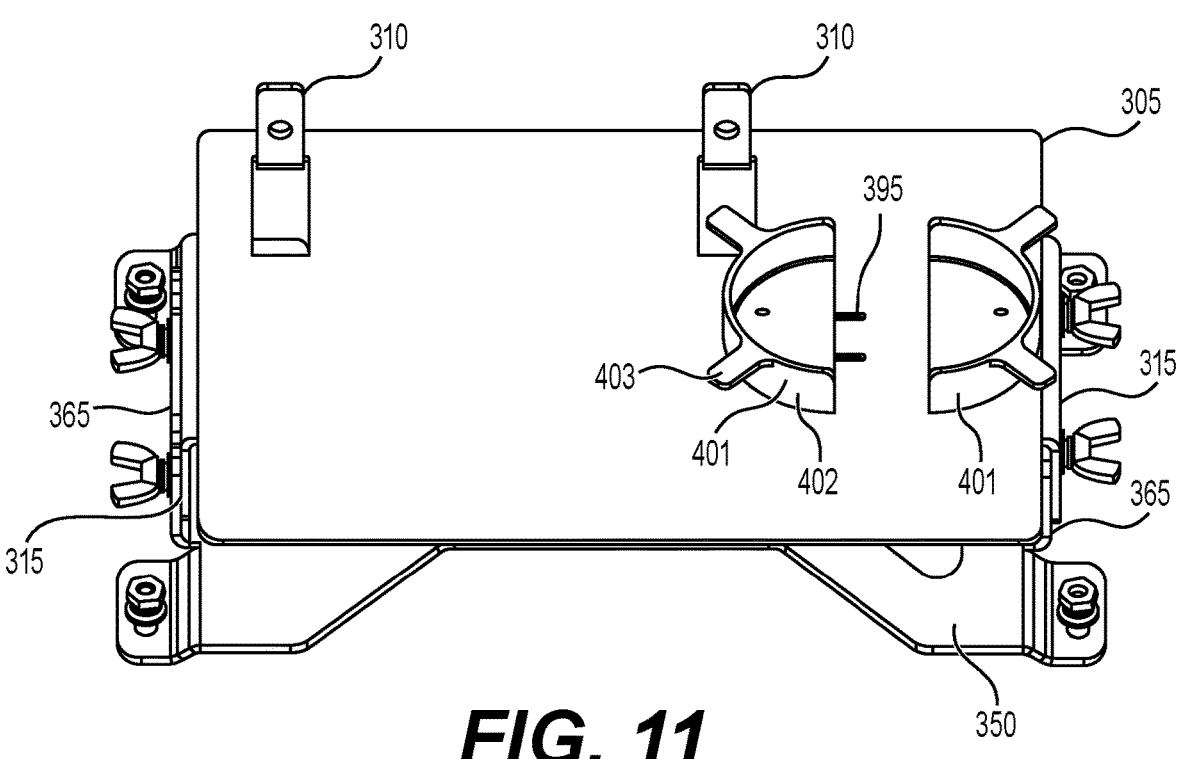
FIG. 11 is a perspective view of an exemplary embodiment of the disclosure.
Figures 12, 13:
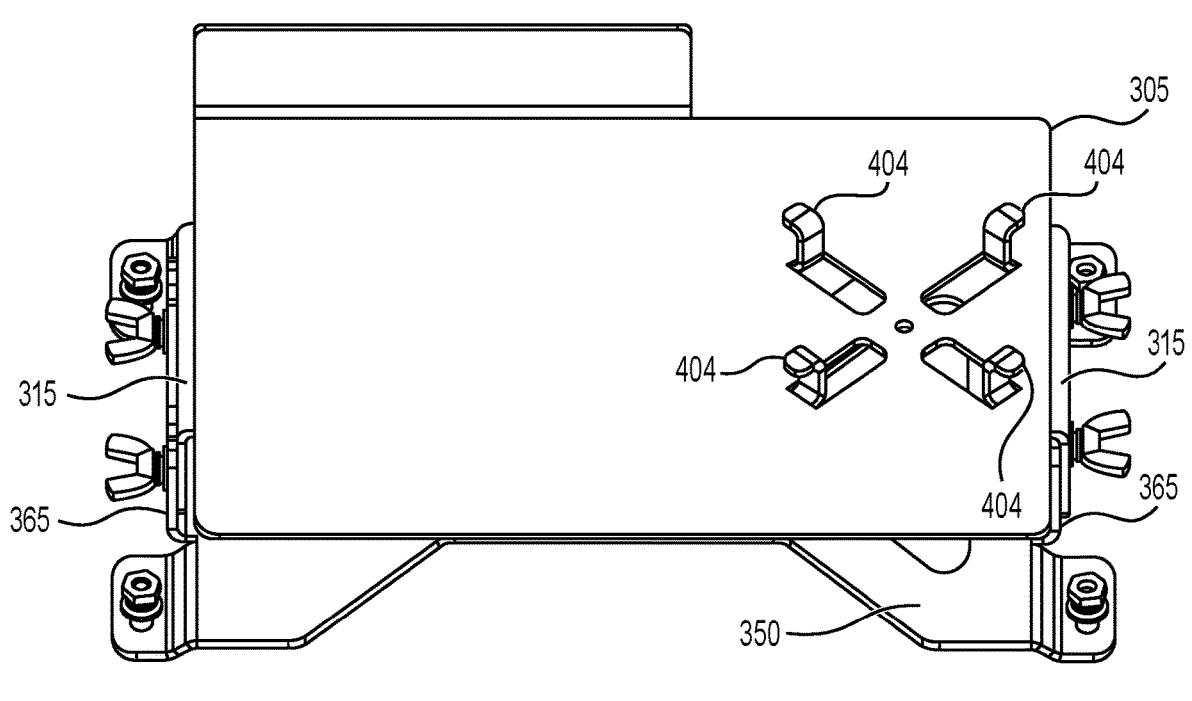
FIG. 12 is a perspective view of an exemplary embodiment of the disclosure.
FIG. 13 is a perspective view of an exemplary embodiment of the disclosure.

FIG. 10 shows the configuration shown in FIG. 4 without the adapter plate 600 attached to tabs 310. FIG. 11 shows, instead of the slack management spool 400, a pair of half spools 401 attached to support plate 305. One or both of the half spools 401 is mounted in slots 395 to allow the distance between the half spools 401 to be adjusted to better accommodate the amount of optical fiber that is wrapped around the half spools 401. Each half spool 401 is shown having a side wall 402 and tabs 403 extending from the side wall 402. FIG. 12 shows, instead of the slack management spool 400, a number of (in this example, four) tabs 404 that are monolithic (unitary single-piece construction) with the support plate 305. In this example, the tabs 404 are integrally formed with (pressed from) the support plate 305. The tabs 404 are configured to have excess optical fiber wrapped around the tabs 404. FIG. 13 shows, instead of the slack management spool 400, a number (in this example, four pairs) of strap mounts 405 that are monolithic (unitary single-piece construction) with the support plate 305. In this example, the strap mounts 405 are integrally formed with (pressed from) the support plate 305. The strap mounts 405 are configured to receive zip-ties, hook and loop fastener straps, or other bindings that attach the optical fiber to the support plate 305.

Figure 14:
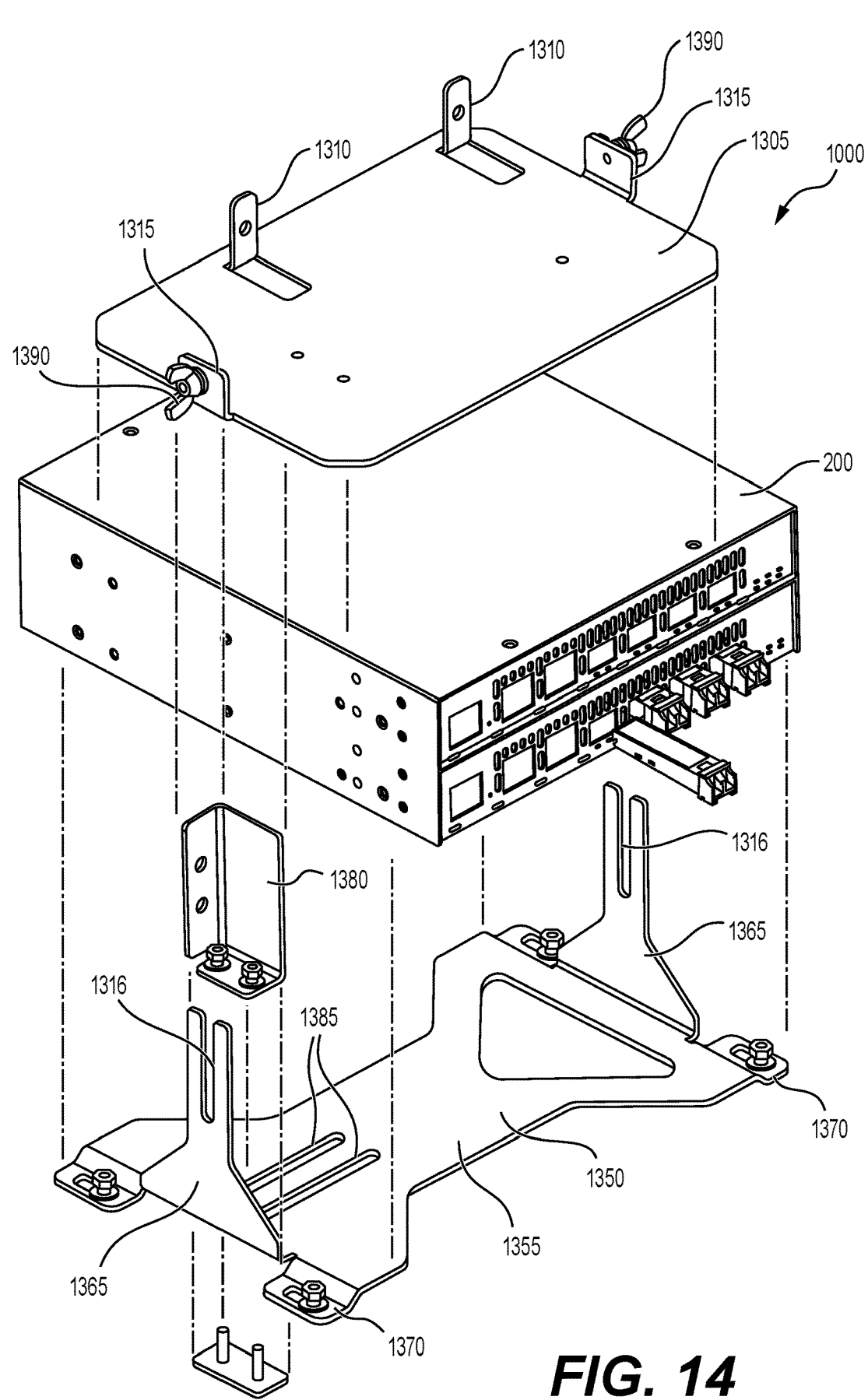
FIG. 14 is an exploded perspective view of an alternate embodiment of the disclosure.
Figure 15:
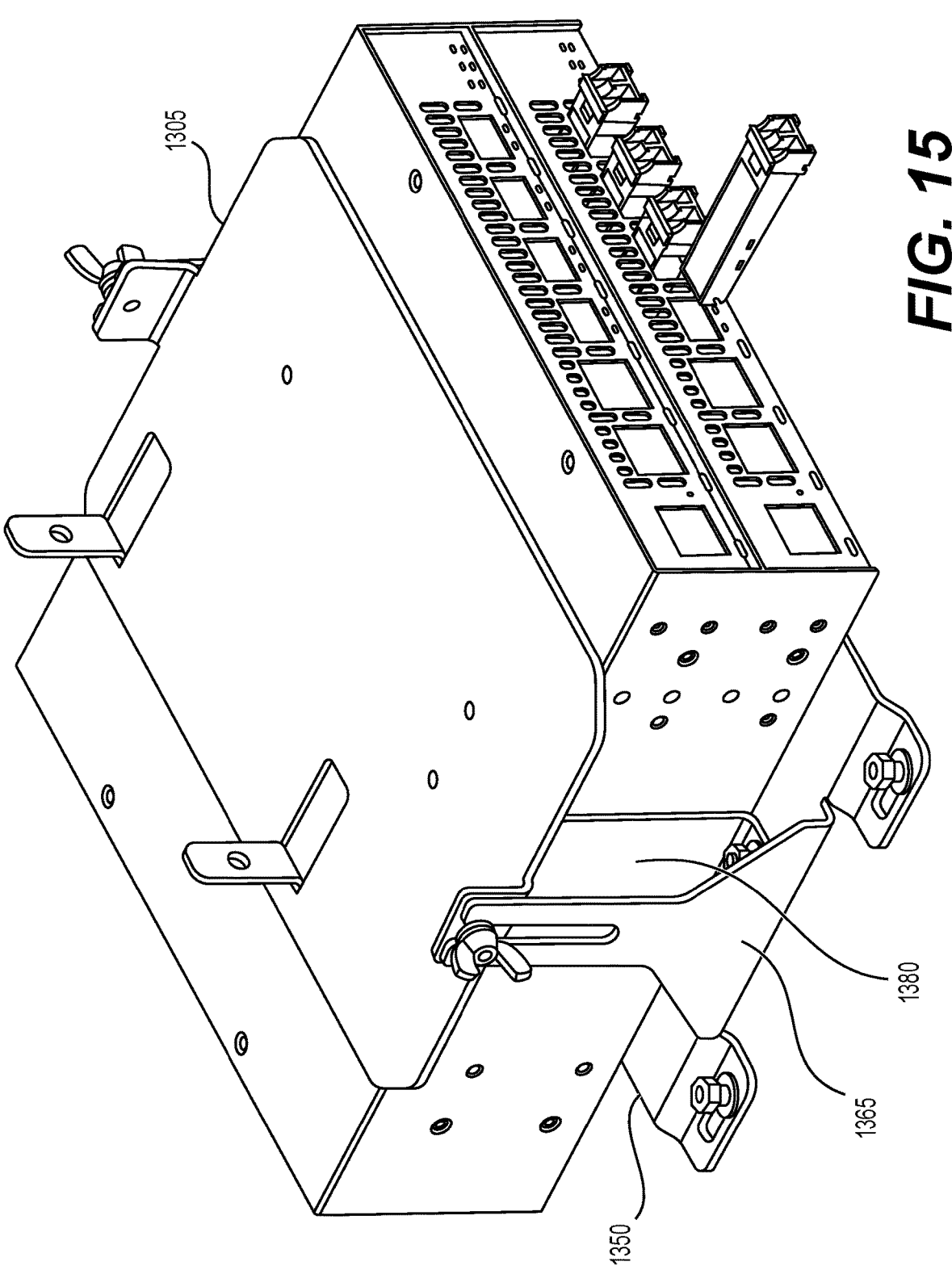
FIG. 15 is an assembled perspective view of the embodiment shown in FIG. 14.

FIGS. 14 and 15 show an alternate configuration of an assembly 1000 As shown in FIGS. 14 and 15, a support portion, for example a support plate, 1305 has two attachment plates 1315 extending from the support plate 1305 at, in this example, 90 degrees. Also, a base portion, for example a base, 1350 has two connector plates 1365 extending from the base 1350 at, in this example, 90 degrees. The attachment plates 1315 are attached to the connector plates 1365 by, in this example, two, wing nuts 1390. In this example, the support plate 1305 can be attached to the base 1350 at one of a number of positions due to slots 1316 in the attachment plates 1315. The height of the space between the support plate 1305 and a base plate 1355 of the base 1350 can be set to be slightly more than the thickness of the router 200. In other examples, the support plate contacts the router 200 to securely hold the router 200 in place. Also shown in FIGS. 14 and 15 is a lateral portion, for example a lateral plate, 1380 that is attached to the base plate 1355 and extends at an angle (in this example, 90 degrees) from the base plate 1355. The lateral plate 1380 is configured to slide (due to slots 1385 in the base plate 1355, better shown in FIG. 14) relative to the base plate 1355 to accommodate routers of different sizes. In the example shown in FIG. 15, the lateral plate 1380 contacts the side of the router 200 to pinch the router 200 between the lateral plate 1380 and the connector plate 1365 on the opposite side of the router 200. In this example, the assembly 1000 is configured to be attached to the enclosure at only base 1350. This example includes four mounting plates 1370 that extend from the base plate 1355. Other examples include fewer or more of the mounting plates 1370.

In the example shown in FIGS. 14 and 15, one or more, in this example a pair of, adapter receiving portions, for example tabs, 1310 extend from the support plate 1305 and are monolithic (unitary single-piece construction) with the support plate 1305. In this example, the tabs 1310 extend perpendicular to the support plate 1305. In other examples, the tabs 1310 extend at an angle other than 90 degrees from the support plate 1305 to better adapt to the device that is attached to the tabs 1310. As in the example shown in FIGS. 1-8, in this example, the tabs 1310 are configured to receive an adapter panel 600.

Although the illustrative embodiments of the present invention have been described herein with reference to the accompanying drawings, it is to be understood that the invention is not limited to those precise embodiments, and that various other changes and modifications may be effected therein by one skilled in the art without departing from the scope or spirit of the invention.

Various changes to the foregoing described and shown structures will now be evident to those skilled in the art. Accordingly, the particularly disclosed scope of the invention is set forth in the following claims.

What is claimed is:

1. A cable management and mounting system comprising:
   a base portion that includes a mounting portion structurally configured to be connected to an enclosure;
   a support portion structurally configured to be connected to the base portion;
   a lateral portion structurally configured to be connected to the base portion;
   wherein the support portion includes a support plate;

wherein the base portion includes a connector portion structurally configured to connect to the support plate;
wherein the support portion includes an attachment portion structurally configured to attach to the connector portion;
wherein the support portion includes an adapter receiving portion extending from the support plate;
wherein the adapter receiving portion is monolithically formed with the support plate;
wherein the attachment portion is structurally configured to slidingly attach to the connector portion to provide adjustment to a distance between the base portion and the support plate in a first direction perpendicular to a surface of the base portion;
wherein the lateral portion is structurally configured to slidingly attach to the base portion to provide adjustment to a distance between the lateral portion and the connector portion;
wherein a space between the base portion and the support plate is structurally configured to receive a router;
wherein the space is structurally configured to be between the lateral portion and the connector portion;
wherein the lateral portion is structurally configured to contact the router; and
wherein the attachment portion and the lateral portion are structurally configured to selectively receive different sized communication devices, different sized adapter units, and a cable in an arrangement that is configured to accommodate the different sized communication devices, the different sized adapter units, and the cable using adapter mounting portions and cable management features that are configured to selectively engage with the support portion so as to avoid a need for additional mounting structures.

2. The system of claim 1, wherein the lateral portion comprises a lateral plate.

3. The system of claim 1, wherein the base portion comprises a base plate.

4. The system of claim 1, wherein the mounting portion comprises a plurality of mounting plates.

5. The system of claim 1, wherein the connector portion comprises a plurality of connector plates.

6. The system of claim 1, wherein the attachment portion comprises a plurality of attachment plates.

7. The system of claim 1, wherein the adapter receiving portion is structurally configured to receive an adapter unit that holds an adapter.

8. The system of claim 1, wherein the distance between the lateral portion and the connector portion is in a second direction parallel to the surface of the base portion.

9. The system of claim 1, wherein a cable management spool is attached to the support plate and the communication device comprises a router.

10. The system of claim 1, wherein the adapter receiving portion is monolithically formed with the support portion.

11. A cable management and mounting system comprising:
   a base portion;
   a support portion structurally configured to slidingly attach to the base portion to provide adjustment to a distance between the base portion and the support portion;
   a lateral portion structurally configured to slidingly attach to the base portion to provide adjustment to a distance between the lateral portion and a connector portion of the base portion;

wherein the support portion includes an adapter receiving portion monolithically formed with a plate portion of the support portion;

wherein a space between the base portion and the support portion is structurally configured to receive a router;

wherein the space is structurally configured to be between the lateral portion and the connector portion; and wherein the support portion and the lateral portion are structurally configured to provide an adjustable arrangement of the base portion, the support portion, and the lateral portion such that the base portion, the support portion, and the lateral portion are structurally configured to receive different sized routing devices, different sized adapter units, and a cable in an arrangement that is configured to accommodate the different sized routing devices, the different sized adapter units, and the cable using adapter mounting portions and cable management features that are configured to engage with the support portion so as to avoid a need for additional mounting features.

12. The system of claim 11, wherein the support portion includes a support plate.

13. The system of claim 11, wherein the base portion includes a mounting portion structurally configured to be connected to an enclosure.

14. The system of claim 11, wherein the support portion includes an attachment portion structurally configured to attach to the connector portion.

15. The system of claim 11, wherein the distance between the base portion and the support portion is in a first direction perpendicular to a surface of the base portion.

16. The system of claim 15, wherein the distance between the lateral portion and the connector portion is in a second direction parallel to the surface of the base portion.

17. The system of claim 11, wherein the lateral portion is structurally configured to contact the routing device.

18. The system of claim 11, wherein the lateral portion comprises a lateral plate.

19. The system of claim 11, wherein the base portion comprises a base plate.

20. The system of claim 11, wherein a cable management spool is attached to the support portion and the routing device comprises a router.

21. The system of claim 11, wherein the adapter receiving portion is monolithically formed with the support portion.

22. A cable management and mounting system comprising:

a base portion;

a support portion structurally configured to slidingly attach to the base portion;

a lateral portion structurally configured to slidingly attach to the base portion;

wherein the support portion includes an adapter receiving portion;

wherein a space between the base portion and the support portion is structurally configured to receive a communications device;

wherein the space is structurally configured to be between the lateral portion and a connector portion of the base portion; and wherein the support portion and the lateral portion are structurally configured to receive different sized communication devices, different sized adapter units, and a cable in an arrangement that is configured to accommodate the different sized communication device, the different sized adapter units, and the cable using adapter mounting portions and cable management structures that are configured to engage with the support portion to avoid a need for additional mounting structures.

23. The system of claim 22, wherein the support portion is structurally configured to slidingly attach to the base portion to provide adjustment to a distance between the base portion and the support portion.

24. The system of claim 23, wherein the lateral portion is structurally configured to slidingly attach to the base portion to provide adjustment to a distance between the lateral portion and a connector portion of the base portion.

25. The system of claim 24, wherein the distance between the base portion and the support portion is in a first direction perpendicular to a surface of the base portion.

26. The system of claim 25, wherein the distance between the lateral portion and the connector portion is in a second direction parallel to the surface of the base portion.

27. The system of claim 22, wherein the support portion includes a support plate.

28. The system of claim 22, wherein the adapter receiving portion is monolithically formed with the support portion.

29. The system of claim 22, wherein the support portion and the lateral portion are structurally configured to allow the base portion, the support portion and the lateral portion to be adjusted relative to one or more of the other relative to each other so as to accommodate the different sized communication device, the different sized adapter units, and the cable using the adapter mounting portions and the cable management structures.

* * * * *